(12) United States Patent
Zhahg et al.

(10) Patent No.: US 12,461,413 B2
(45) Date of Patent: Nov. 4, 2025

(54) DIMMING ASSEMBLY, BACKLIGHT MODULE AND DISPLAY DEVICE

(71) Applicants: Nanjing BOE Display Technology CO., LTD., Jiangsu (CN); BOE Technology Group Co., Ltd., Beijing (CN)

(72) Inventors: Minghui Zhahg, Beijing (CN); Lei Liu, Beijing (CN); Yao Zhang, Beijing (CN); Dongyu Liu, Beijing (CN); Hui Guo, Beijing (CN)

(73) Assignees: Nanjing BOE Display Technology CO., LTD., Jiangsu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/704,910

(22) PCT Filed: Jul. 28, 2023

(86) PCT No.: PCT/CN2023/110020
§ 371 (c)(1),
(2) Date: Apr. 25, 2024

(87) PCT Pub. No.: WO2025/025014
PCT Pub. Date: Feb. 6, 2025

(65) Prior Publication Data
US 2025/0271700 A1  Aug. 28, 2025

(51) Int. Cl.
*G02F 1/133* (2006.01)
*G02F 1/1335* (2006.01)
*G02F 1/13357* (2006.01)

(52) U.S. Cl.
CPC .. *G02F 1/133607* (2021.01); *G02F 1/133611* (2013.01)

(58) Field of Classification Search
CPC .................................................. G02F 1/133607
(Continued)

(56) References Cited

U.S. PATENT DOCUMENTS

| 2008/0136997 A1* | 6/2008 | Chang | G02B 6/0053 349/95 |
| 2013/0258227 A1 | 10/2013 | Chang et al. | |
| 2021/0286214 A1* | 9/2021 | Chen | G02B 6/0051 |

FOREIGN PATENT DOCUMENTS

| CN | 201145795 Y | 11/2008 |
| CN | 102591067 A | 7/2012 |

(Continued)

*Primary Examiner* — Christopher M Raabe
(74) *Attorney, Agent, or Firm* — Ling Wu; Stephen Yang; Ling and Yang Intellectual Property

(57) ABSTRACT

A dimming assembly includes a first prism sheet and a second prism sheet disposed oppositely, and an auxiliary film on a side of the first prism sheet away from the second prism sheet. The first prism sheet includes multiple first dimming portions extending in a first direction and arranged in an array. The second prism sheet includes multiple second dimming portions extending in a second direction and arranged in an array. An included angle between the third direction and the first direction is a first cutting angle, and an included angle between the third direction and the second direction is a second cutting angle. An absolute value of the second cutting angle is greater than an absolute value of the first cutting angle, and the absolute values of the first cutting angle and the second cutting angle are greater than or equal to 0 and less than 90 degrees.

20 Claims, 9 Drawing Sheets

(58) Field of Classification Search
USPC .......................................................... 349/64
See application file for complete search history.

(56) References Cited

FOREIGN PATENT DOCUMENTS

| | | | |
|---|---|---|---|
| CN | 108897083 | A | 11/2018 |
| CN | 209231659 | U | 8/2019 |
| CN | 111580308 | A | 8/2020 |
| CN | 211979374 | U | 11/2020 |
| CN | 112526783 | A | 3/2021 |
| CN | 212846273 | U | 3/2021 |
| CN | 112731713 | A | 4/2021 |
| CN | 113075813 | A | 7/2021 |
| CN | 114280850 | A | 4/2022 |
| CN | 216956603 | U | 7/2022 |
| CN | 220556483 | U | 3/2024 |

\* cited by examiner

DIMMING ASSEMBLY, BACKLIGHT MODULE AND DISPLAY DEVICE

CROSS-REFERENCE TO RELATED APPLICATION

The present application is a U.S. National Phase Entry of International Application PCT/CN2023/110020 having an international filing date of Jul. 28, 2023, and entitled "Dimming Assembly, Backlight Module and Display Device", the contents of which are hereby incorporated by reference in their entireties.

TECHNICAL FIELD

The present disclosure relates to, but is not limited to, the display technical field, in particular to a dimming assembly, a backlight module and a display device.

BACKGROUND

With development of technology, displays have been widely used in different fields and are inseparable from people's work, study and life. Nowadays, people's demands for performance of displays are getting higher and higher. How to create products with higher brightness and higher picture quality is a major challenge for the display industry. Especially in recent years, with the rise of concept of low carbon and environmental protection, people have higher and higher requirements on power consumption of displays. In order to meet ES8.0 standard, display manufacturers add a DBEF (Dual Brightness Enhancement Film) to a backlight module. However, conventional backlight modules using DBEFs cannot meet the visual angle requirements of TCO (Tjästemännens Central Organization) standard. TCO standard is a display certification standard promoted by Swedish Labor Union (TCO), which is recognized as one of the most popular certifications in the display industry at present. How to further improve brightness on the premise of ensuring a viewing angle has become one of difficult problems in the industry.

SUMMARY

The following is a summary of subject matter described herein in detail. This summary is not intended to limit the protection scope of the claims.

An embodiment of the present disclosure provides a dimming assembly, a backlight module and a display device.

In one aspect, an embodiment provides a dimming assembly including a first prism sheet and a second prism sheet disposed oppositely, and an auxiliary film located on a side of the first prism sheet away from the second prism sheet. The first prism sheet has a first surface and a second surface which are opposite to each other, wherein the first surface includes a plurality of first dimming portions extending in a first direction and arranged in an array. The second prism sheet has a third surface and a fourth surface which are opposite to each other, wherein the third surface is located on a side of the second prism sheet close to the first prism sheet, and the third surface includes a plurality of second dimming portions extending in a second direction and arranged in an array. The first prism sheet further has at least one first side surface extending in a third direction and connecting the first surface with the second surface; and the second prism sheet further has at least one second side surface extending in the third direction and connecting the third surface with the fourth surface. An included angle between the third direction and the first direction is a first cutting angle of the first prism sheet, and an included angle between the third direction and the second direction is a second cutting angle of the second prism sheet. An absolute value of the second cutting angle of the second prism sheet is greater than an absolute value of the first cutting angle of the first prism sheet, and the absolute values of the first cutting angle and the second cutting angle are greater than or equal to 0 and less than 90 degrees.

In some exemplary embodiments, the absolute value of the first cutting angle is greater than or equal to 0 and less than or equal to 15 degrees.

In some exemplary embodiments, the absolute value of the first cutting angle is greater than or equal to 3 degrees and less than or equal to 10 degrees.

In some exemplary embodiments, a difference between the absolute value of the first cutting angle and the absolute value of the second cutting angle ranges from 45 degrees to 75 degrees.

In some exemplary embodiments, the absolute value of the second cutting angle is greater than or equal to 60 degrees and less than or equal to 75 degrees.

In some exemplary embodiments, the absolute value of the second cutting angle is greater than or equal to 60 degrees and less than or equal to 75 degrees.

In some exemplary embodiments, the first cutting angle is 5 degrees, and the second cutting angle is 75 degrees.

In some exemplary embodiments, a haze of the first prism sheet and a haze of the second prism sheet both range from 10% to 45%, and the haze of the first prism sheet is less than the haze of the second prism sheet.

In some exemplary embodiments, the haze of the first prism sheet ranges from 15% to 30% and the haze of the second prism sheet ranges from 25% to 45%.

In some exemplary embodiments, the haze of the first prism sheet is 15% and the haze of the second prism sheet is 40%.

In some exemplary embodiments, each first dimming portion of the first prism sheet has two first extension surfaces extending in the first direction; in a cross section perpendicular to the second surface and perpendicular to the first direction, end portions of the two first extension surfaces away from the second surface intersect to form a first intersection line; and a distance between adjacent first intersection lines is a first dimming pitch. Each second dimming portion of the second prism sheet has two second extension surfaces extending in the second direction; in a cross section perpendicular to the fourth surface and perpendicular to the second direction, end portions of the two second extension surfaces away from the fourth surface intersect to form a second intersection line; and a distance between adjacent second intersection lines is a second dimming pitch. Both of the first dimming pitch and the second dimming pitch range from 25 microns to 50 microns.

In some exemplary embodiments, both of the first dimming pitch and the second dimming pitch range from 30 microns to 45 microns.

In some exemplary embodiments, each first dimming portion of the first prism sheet has two first extension surfaces extending in the first direction; and in a cross section perpendicular to the second surface and perpendicular to the first direction, an included angle between the two first extension surfaces ranges from 87 degrees to 92 degrees. Each second dimming portion of the second prism sheet has two second extension surfaces extending in the second direction; and in a cross section perpendicular to the fourth surface and perpendicular to the second direction, an included angle between the two second extension surfaces ranges from 87 degrees to 92 degrees.

In some exemplary embodiments, refractive indices of the first dimming portions of the first prism sheet and the second dimming portions of the second prism sheet range from 1.45 to 1.7.

In some exemplary embodiments, refractive indices of the first dimming portions of the first prism sheet and the second dimming portions of the second prism sheet range from 1.52 to 1.61.

In some exemplary embodiments, the dimming assembly further includes a diffuser located on a side of the second prism sheet away from the first prism sheet and configured to diffuse transmitted light and direct the diffused light toward the second prism sheet.

In another aspect, an embodiment provides a backlight module including a light source assembly and the dimming assembly as described above, wherein the light source assembly is configured to generate light directed towards the dimming assembly.

In still another aspect, an embodiment provides a display device including the backlight module as described above and a liquid crystal panel located on a light-emitting side of the backlight module.

Other aspects of the present disclosure may be comprehended after the drawings and the detailed descriptions are read and understood.

BRIEF DESCRIPTION OF DRAWINGS

Accompanying drawings are used for providing further understanding of technical solutions of the present disclosure, constitute a part of the specification, and are used for explaining the technical solutions of the present disclosure together with embodiments of the present disclosure, but do not constitute limitations on the technical solutions of the present disclosure.

DETAILED DESCRIPTION

Figure 1:
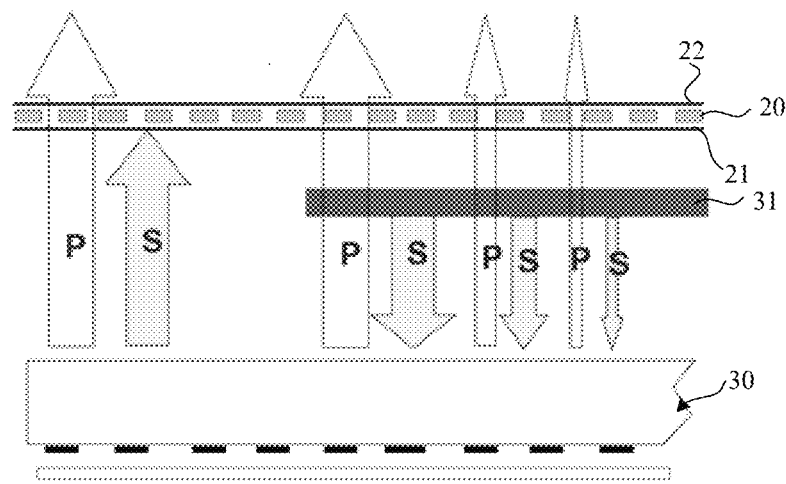
FIG. 1 is a schematic diagram of optical principle of a DBEF.

The embodiments of the present disclosure will be described below with reference to the drawings in detail. Implementations may be implemented in multiple different forms. Those of ordinary skills in the art may easily understand such a fact that implementations and contents may be transformed into other forms without departing from the purpose and scope of the present disclosure. Therefore, the present disclosure should not be explained as being limited to the contents recorded in the following implementations only. The embodiments and features in the embodiments of the present disclosure may be randomly combined with each other if there is no conflict.

In the drawings, a size of one or more constituent elements, a thickness of a layer, or a region is sometimes exaggerated for clarity. Therefore, one implementation of the present disclosure is not necessarily limited to the size, and a shape and a size of one or more components in the drawings do not reflect an actual scale. In addition, the accompanying drawings schematically illustrate ideal examples, and one implementation of the present disclosure is not limited to shapes, numerical values, or the like shown in the drawings.

Ordinal numerals "first", "second", "third", etc., in the specification are set not to form limitations on numbers but only to avoid confusion between constituent elements. In the present disclosure, "plurality" represents two or more than two.

In the specification, for convenience, expressions "central", "above", "below", "front", "back", "vertical", "horizontal", "top", "bottom", "inside", "outside", etc., indicating directional or positional relationships are used to illustrate positional relationships between the constituent elements, not to indicate or imply that involved devices or elements are required to have specific orientations and be structured and operated with the specific orientations but only to easily and simply describe the present specification, and thus should not be understood as limitations on the present disclosure. The positional relationships between the constituent elements are changed as appropriate according to a direction according to which the constituent elements are described. Therefore, appropriate replacements based on situations are allowed, which is not limited to the expressions in the specification.

In the specification, unless otherwise specified and defined, terms "mounting", "mutual connection", and "connection" should be understood in a broad sense. For example, it may be a fixed connection, a detachable connection, or an integral connection; it may be a mechanical connection or an electrical connection; it may be a direct connection, an indirect connection through a middleware, or internal communication inside two elements. Those of ordinary skills in the art may understand meanings of the aforementioned terms in the present disclosure according to situations.

In the specification, "parallel" refers to a state in which an angle formed by two straight lines is −10° or more and 100 or less, and thus also includes a state in which the angle is −5° or more and 5° or less. In addition, "perpendicular" refers to a state in which an angle formed by two straight lines is 80° or more and 100° or less, and thus also includes a state in which the angle is 85° or more and 95° or less.

In this specification, a circle, oval, triangle, rectangle, trapezoid, pentagon or hexagon, etc. is not strictly defined, but may be an approximate circle, oval, triangle, rectangle, trapezoid, pentagon or hexagon, etc. Some small deformations due to tolerances may exist, for example, guide angles, curved edges and deformations thereof may exist.

In the present disclosure, "about" and "substantially" refer to that a boundary is not defined strictly and a case within a range of process and measurement errors is allowed. In the present disclosure, "substantially the same" refers to a case where numerical values differ by less than 10%. In the present disclosure, "symmetry" is a case where a boundary is not defined strictly and approximate symmetry is allowed within process and measurement errors.

In some implementations, a liquid crystal display device mainly includes a backlight module and a liquid crystal panel disposed on a light-emitting side of the backlight module. The backlight module may provide a surface light source to a liquid crystal panel, so that the liquid crystal panel may display images normally. The backlight module mainly includes a light source assembly and a dimming assembly disposed on a light-emitting side of the light source assembly. When displaying, light emitted by the light source assembly passes through a dimming assembly and is directed to the liquid crystal panel, so that the liquid crystal panel may display images normally. The dimming assembly typically employs an optical film prism sheet, which may utilize optical refraction to form a brightness increase in a central viewing angle. For example, the dimming assembly may adopt two stacked prism sheets whose prism angles are perpendicular to each other (for example, a cutting angle of an upper prism sheet is 0 degrees, and a cutting angle of a lower prism sheet is 90 degrees) to converge light in both horizontal and vertical directions to a front viewing angle (i.e., 0-degree viewing angle), thereby improving display brightness in the front viewing angle and enabling the liquid crystal display device to obtain higher brightness gain. In order to further improve brightness of the backlight module and meet power consumption requirements, the dimming assembly may include two stacked prism sheets with perpendicular prism angles and an auxiliary film (for example, DBEF) located on a light-emitting side of the two prism sheets. However, the current dimming assembly cannot meet viewing angle requirements of TCO 8.0 standard.

An embodiment provides a dimming assembly, a backlight module and a display device, which may balance requirements of both brightness and viewing angle, and provide better brightness gain while meeting the viewing angle requirements of TCO 8.0 standard.

An embodiment provides a dimming assembly, including a first prism sheet and a second prism sheet disposed oppositely, and an auxiliary film located on a side of the first prism sheet away from the second prism sheet. The first prism sheet has a first surface and a second surface which are opposite to each other, wherein the first surface includes a plurality of first dimming portions extending in a first direction and arranged in an array. The second prism sheet has a third surface and a fourth surface which are opposite to each other, wherein the third surface is located on a side of the second prism sheet close to the first prism sheet, and the third surface includes a plurality of second dimming portions extending in a second direction and arranged in an array. The first prism sheet further has at least one first side surface extending in a third direction and connected with the first surface and the second surface. The second prism sheet further has at least one second side surface extending in the third direction and connected with the third surface and the fourth surface. An included angle between the third direction and the first direction is a first cutting angle of the first prism sheet, and an included angle between the third direction and the second direction is a second cutting angle of the second prism sheet. An absolute value of the second cutting angle of the second prism sheet is greater than an absolute value of the first cutting angle of the first prism sheet, and the absolute values of the first cutting angle and the second cutting angle are greater than or equal to 0 and less than 90 degrees.

In some examples, the auxiliary film may be a reflective Dual Brightness Enhancement Film (DBEF).

In this example, plus or minus of an angle indicates a direction of rotation that forms the angle, but not a magnitude of the angle. A positive angle represents an angle formed by counterclockwise rotation, and a negative angle represents an angle formed by clockwise rotation.

By providing the ranges of the first cutting angle of the first prism sheet and the second cutting angle of the second prism sheet and a magnitude relationship therebetween, the dimming assembly provided by this embodiment may ensure that viewing angle requirements of TCO is met while achieving high brightness, thereby facilitating improvement of performance of the display product.

In some exemplary embodiments, the absolute value of the first cutting angle is greater than or equal to 0 degree and less than or equal to 15 degrees. In some examples, the absolute value of the first cutting angle may be greater than or equal to 3 degrees and less than or equal to 10 degrees. Further brightness gain may be achieved by the range of the first cutting angle in this example.

In some exemplary embodiments, a difference between the absolute value of the first cutting angle and the absolute value of the second cutting angle may range from 45 degrees to 75 degrees. In some examples, the absolute value of the second cutting angle may be greater than or equal to 60 degrees and less than or equal to 75 degrees. In some examples, the absolute value of the second cutting angle may be greater than or equal to 65 degrees and less than or equal to 70 degrees. The range of the second cutting angle in this example may take into account requirements of both viewing angle and brightness.

In some exemplary embodiments, a haze of the first prism sheet and a haze of the second prism sheet may both range from 10% to 45% (i.e., greater than or equal to 10% and less than or equal to 45%). The haze of the first prism sheet may be less than the haze of the second prism sheet. In some examples, the haze of the first prism sheet may range from 15% to 30% (i.e., greater than or equal to 15% and less than or equal to 30%), and the haze of the second prism sheet may range from 25% to 45% (i.e., greater than or equal to 25% and less than or equal to 45%). For example, the haze of the first prism sheet may be 15%, and the haze of the second prism sheet may be 40%. The haze ranges of the first prism sheet and the second prism sheet in this example may meet requirements of both viewing angle and brightness.

In some exemplary embodiments, each first dimming portion of the first prism sheet may have two first extension surfaces extending in the first direction. In a cross section perpendicular to the second surface and perpendicular to the first direction, end portions of the two first extension surfaces away from the second surface intersect to form a first intersection line, and a distance between adjacent first intersection lines is a first dimming pitch. Each second dimming portion of the second prism sheet may have two second extension surfaces extending in the second direction. In a cross section perpendicular to the fourth surface and perpendicular to the second direction, end portions of the two second extension surfaces away from the fourth surface intersect to form a second intersection line, and a distance between adjacent second intersection lines is a second dimming pitch. The first dimming pitch and the second dimming pitch may range from 25 microns to 50 microns. In some examples, the first dimming pitch and the second dimming pitch may range from 30 microns to 45 microns. The ranges of the first dimming pitch and the second dimming pitch provided in this example may meet requirements of both viewing angle and brightness.

In some exemplary embodiments, each first dimming portion of the first prism sheet may have two first extension surfaces extending in the first direction. In a cross section perpendicular to the second surface and perpendicular to the first direction, an included angle between the two first extension surfaces ranges from 87 degrees to 92 degrees, for example, the included angle may be about 90 degrees. The included angle between the two first extension surfaces is a vertex angle of the first dimming portion. Each second dimming portion of the second prism sheet may have two second extension surfaces extending in the second direction. In a cross section perpendicular to the fourth surface and perpendicular to the second direction, an included angle between the two second extension surfaces ranges from 87 degrees to 92 degrees, for example, the included angle may be about 90 degrees. The included angle between the two second extension surfaces is a vertex angle of the second dimming portion. Higher brightness may be achieved by the ranges of the vertex angles of the first dimming portion and the second dimming portion provided in this example.

In some exemplary embodiments, refractive indices of the first dimming portions of the first prism sheet and the second dimming portions of the second prism sheet may range from 1.45 to 1.7. In some examples, the refractive indices of the first dimming portions of the first prism sheet and the second dimming portions of the second prism sheet may be 1.52 to 1.61. The ranges of the refractive indices of the first dimming portions and the second dimming portions provided in this example may facilitate improvement of brightness and ensure scratch resistance.

Schemes of the embodiments will be described below through some examples. In the following example, illustration is made with an example in which an auxiliary film is DBEF.

FIG. 1 is a schematic diagram of optical principle of a DBEF. As shown in FIG. 1, a first polarizer (also referred to as an upper polarizer) 21 and a second polarizer (also referred to as a lower polarizer) 22 may be provided on two sides of a liquid crystal panel 20, respectively. The DBEF 31 may be disposed between a light source assembly 30 and the first polarizer 21. Since light waves are transverse waves and their vibration direction is perpendicular to their propagation direction, light may be divided into P waves whose vibration direction is in a plane formed by incident light and a normal line and S waves whose vibration direction is perpendicular to a plane formed by incident light and a normal line. P waves are parallel to an optical vibration surface, and S waves are perpendicular to the optical vibration surface. A core principle of the DBEF 31 is to use a multilayer thin film structure to convert polarization state of incident light in a lower layer into light in the transmittable direction of the first polarizer 21. For example, the P waves of the incident light are consistent with a polarization direction of the first polarizer 21 and may pass through the first polarizer 21. The DBEF 31 may reflect the S waves of the incident light and emit the P waves of the incident light toward the first polarizer 21, which may increase light transmittance of the first polarizer 21, thereby increasing the brightness of the liquid crystal panel 20.

Figure 2A:
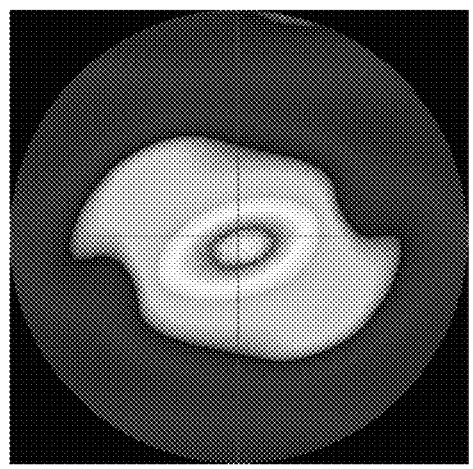
FIG. 2A is a brightness full-view distribution diagram of a backlight module without using a DBEF.
Figure 2B:
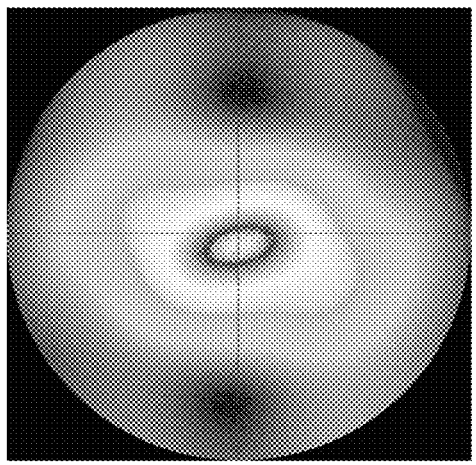
FIG. 2B is a brightness full-view distribution diagram of a backlight module using a DBEF.

FIG. 2A is a brightness full-view distribution diagram of a backlight module without a DBEF. FIG. 2B is a brightness full-view distribution diagram of a backlight module using a DBEF. A dimming assembly of the backlight module corresponding to FIG. 2A may include two stacked prism sheets whose prism angles are perpendicular to each other. A dimming assembly of the backlight module corresponding to FIG. 2B may include two stacked prism sheets whose prism angles are perpendicular to each other, and a DBEF located on a light-emitting side of the two prism sheets. In the full-view distribution diagram, the abscissa axis represents a horizontal view, the ordinate axis represents a vertical view, and different brightness is represented by different gray levels.

As shown in FIGS. 2A and 2B, due to the relatively high haze of DBEF, the full-view optical form of the backlight module will be rearranged. Therefore, the current backlight module using DBEF still has the problem that it cannot meet viewing angle requirements of TCO standard.

By setting the ranges of the first cutting angle of the first prism sheet and the second cutting angle of the second prism sheet and the magnitude relationship therebetween, the dimming assembly provided by this embodiment may ensure that the viewing angle requirements of TCO is met while realizing high brightness, thereby facilitating the improvement of performance of the display product.

Figure 3:
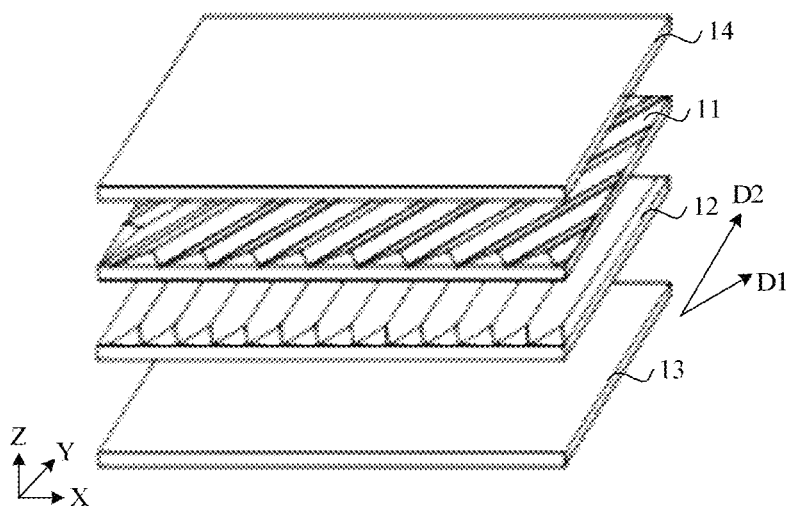
FIG. 3 is a schematic diagram of a dimming assembly according to at least one embodiment of the present disclosure.
Figure 4:
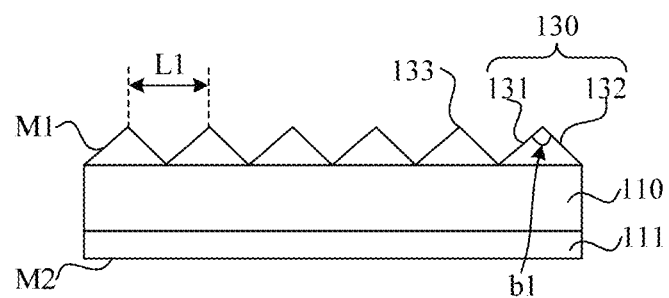
FIG. 4 is a schematic cross-sectional view of a first prism sheet according to at least one embodiment of the present disclosure.
Figure 5:
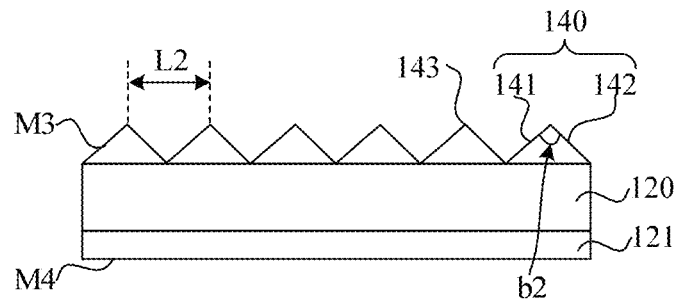
FIG. 5 is a schematic cross-sectional view of a second prism sheet according to at least one embodiment of the present disclosure.
Figure 6:
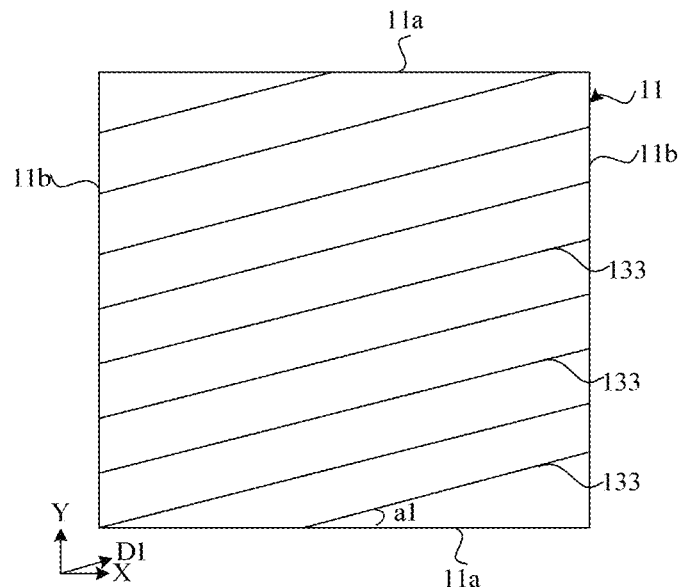
FIG. 6 is a schematic top view of a first prism sheet according to at least one embodiment of the present disclosure.
Figure 7:
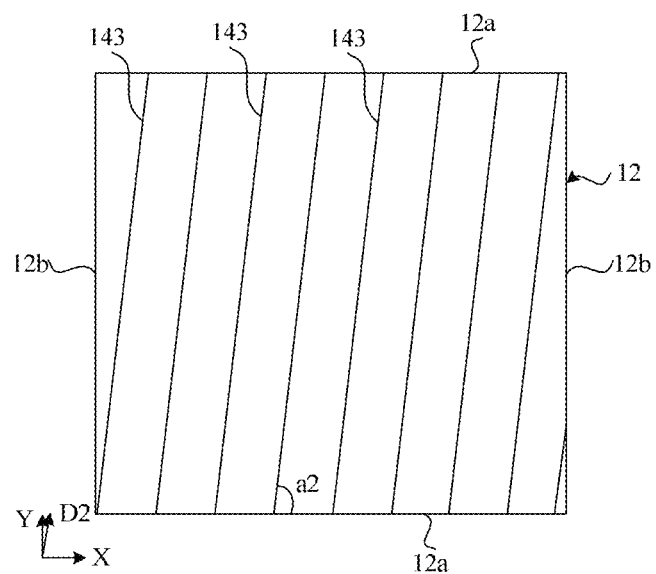
FIG. 7 is a schematic top view of a second prism sheet according to at least one embodiment of the present disclosure.

FIG. 3 is a schematic diagram of a dimming assembly according to at least one embodiment of the present disclosure. FIG. 4 is a schematic cross-sectional view of a first prism sheet according to at least one embodiment of the present disclosure. FIG. 5 is a schematic cross-sectional view of a second prism sheet according to at least one embodiment of the present disclosure. FIG. 6 is a schematic top view of a first prism sheet according to at least one embodiment of the present disclosure. FIG. 7 is a schematic top view of a second prism sheet according to at least one embodiment of the present disclosure. FIG. 4 shows a cross section of the first prism sheet perpendicular to a second surface M2 and perpendicular to a first direction D1. FIG. 5 shows a cross section of the second prism sheet perpendicular to a fourth surface M4 and perpendicular to a second direction D2.

In some examples, as shown in FIGS. 3 to 7, the dimming assembly of this example may include a first prism sheet 11, a second prism sheet 12, a DBEF 14, and a diffuser 13. The first prism sheet 11 and the second prism sheet 12 are disposed oppositely. For example, the diffuser 13, the second prism sheet 12, the first prism sheet 11, and the DBEF 14 may be sequentially provided on a light-emitting side of a light source assembly. The first prism sheet 11 may be located on a light-emitting side of the second prism sheet 12, and the DBEF 14 may be located on a light-emitting side of the first prism sheet 11. In some examples, the first prism sheet 11 may be referred to as an upper prism sheet, and the second prism sheet 12 may be referred to as a lower prism sheet.

In some examples, as shown in FIGS. 3 4 and 6, the first prism sheet 11 may have a first surface M1 and a second surface M2 which are opposite to each other. The first surface M1 may include a plurality of first dimming portions 130 extending in the first direction D1 and arranged in an array. In some examples, an orthographic projection of the first prism sheet 11 on the second surface may be substantially rectangular. The first prism sheet 11 may also have two first side surfaces 11a and two third side surfaces 11b that connect the first surface M1 with the second surface M2. The two first side surfaces 11a may extend in a third direction X and are disposed oppositely in a fourth direction Y. The two third side surfaces 11b may extend in the fourth direction Y and are disposed oppositely in the third direction X. Each first side surface 11a may connect an edge of the first surface M1 in the fourth direction Y with an edge of the second surface M2 on the same side in the fourth direction Y. Each third side surface 11b may connect an edge of the first surface M1 in the third direction X with an edge of the second surface M2 on the same side in the third direction X. For example, the two first side surfaces 11a and the two third side surfaces 11b may all be perpendicular to the second surface M2. The third direction X may be perpendicular to the fourth direction Y. A plane where the third direction X and the fourth direction Y are located may be a horizontal plane, the third direction X may be parallel to a horizontal line, and a fifth direction Z may be perpendicular to a plane where the third direction X and the fourth direction Y are located. The fifth direction Z may be a thickness direction of the first prism sheet 11 and the second prism sheet 12. The first direction D1 intersects both the third direction X and the fourth direction Y. An included angle between the first direction D1 and the third direction X may be a first cutting angle a1 of the first prism sheet 11.

In some examples, as shown in FIGS. 3, 5 and 7, the second prism sheet 12 may have a third surface M3 and a fourth surface M4 which are opposite to each other. The third surface M2 may include a plurality of second dimming portions 140 extending in the second direction D2 and arranged in an array. In some examples, an orthographic projection of the second prism sheet 12 on the fourth surface may be substantially rectangular. The second prism sheet 12 may also have two second side surfaces 12a and two fourth side surfaces 12b that connect the third surface M3 with the fourth surface M4. The two second side surfaces 12a may both extend in the third direction X and are disposed oppositely in the fourth direction Y. The two fourth side surfaces 12b may both extend in the fourth direction Y and are disposed oppositely in the third direction X. Each second side surface 12a may connect an edge of the third surface M3 in the fourth direction Y with an edge of the fourth surface M4 on the same side in the fourth direction Y. Each fourth side surface 12b may connect an edge of the third surface M3 in the third direction X with an edge of the fourth surface M4 on the same side in the third direction X. For example, the two third side surfaces 12a and the two fourth side surfaces 12b may all be perpendicular to the fourth surface M4. An included angle between the second direction D2 and the third direction X may be a second cutting angle a2 of the second prism sheet 12. The first cutting angle a1 may be different from the second cutting angle a2 such that the first direction D1 intersects the second direction D2. For example, an absolute value of the second cutting angle a2 may be greater than an absolute value of the first cutting angle a1.

In some examples, the absolute values of the first cutting angle a1 and the second cutting angle a2 may be greater than or equal to 0 and less than 90 degrees. In some examples, a difference between the absolute value of the first cutting angle a1 and the absolute value of the second cutting angle a2 may range from 45 degrees to 75 degrees. In some examples, the absolute value of the first cutting angle a1 may be greater than or equal to 0 and less than or equal to 15 degrees. For example, the absolute value of the first cutting angle a1 may be greater than or equal to 3 degrees and less than or equal to 10 degrees. The absolute value of the second cutting angle a2 may be greater than or equal to 60 degrees and less than or equal to 75 degrees. For example, the absolute value of the second cutting angle a2 may be greater than or equal to 65 degrees and less than or equal to 70 degrees. The angles of the first cutting angle and the second cutting angle provided in this example may meet requirements of both viewing angle and brightness.

In some examples, as shown in FIG. 4, each of the first dimming portions 130 may include two first extension surfaces 131 and 132 extending in the first direction D1, and extended edges of the two first extension surfaces 131 and 132 intersect on a side away from the second surface M2. End portions of the two first extension surfaces 131 and 132 away from the second surface M2 may intersect at a first intersection line 133. An extending direction of the first intersection line 133 may be parallel to the first direction D1.

In some examples, as shown in FIG. 4, in a cross section perpendicular to the second surface M2 and perpendicular to the first direction D1, a shape of the cross section of each first dimming portion 130 of the first prism sheet 11 may be a triangle, for example, an isosceles triangle. An included angle between the first extension surface 131 and the second surface M2 may be substantially the same as an included angle between the first extension surface 132 and the second surface M2. The first extension surfaces 131 and 132 may be substantially symmetrical with respect to the first intersection line 133.

In some examples, as shown in FIG. 4, an included angle between the two first extension surfaces 131 and 132 is b1. b1 may be referred to as a vertex angle of the first dimming portion 130. In some examples, the included angle b1 between the two first extension surfaces 131 and 132 may be 87 degrees to 92 degrees, for example 90 degrees. By providing the included angle between the two first extension surfaces 131 and 132 to be approximately 90 degrees, a better brightness may be achieved. In some other examples, a filleted corner may be formed at a connecting position of the two first extension surfaces 131 and 132.

In some examples, as shown in FIG. 5, each of the second dimming portions 140 may include two second extension surfaces 141 and 142 extending in the second direction D2, and extended edges of the two second extension surfaces 141 and 142 intersect on a side away from the fourth surface M4. End portions of the two second extension surfaces 141 and 142 away from the fourth surface M4 may intersect at a second intersection line 143. An extension direction of the second intersection line 143 may be parallel to the second direction D2.

In some examples, as shown in FIG. 5, in a cross section perpendicular to the fourth surface M4 and perpendicular to the second direction D2, a shape of the cross section of each second dimming portion 140 of the second prism sheet 12 may be a triangle, for example, an isosceles triangle. An included angle between the second extension surface 141 and the fourth surface M4 may be substantially the same as an included angle between the second extension surface 142 and the fourth surface M4. The second extension surfaces 141 and 142 may be substantially symmetrical with respect to the second intersection line 143.

In some examples, as shown in FIG. 5, an included angle between the two second extension surfaces 141 and 142 is b2. b2 may be referred to as a vertex angle of the second dimming portion 140. For example, b2 may be equal to b1. In some examples, the included angle b2 between the two second extension surfaces 141 and 142 may be 87 degrees to 92 degrees for example 90 degrees. By providing the included angle between the two second extension surfaces 141 and 142 to be approximately 90 degrees, a better brightness may be achieved. In some other examples, a filleted corner may be formed at a connecting position of the two second extension surfaces 141 and 142.

In some examples, the second surface M2 of the first prism sheet 11 and the fourth surface M4 of the second prism sheet 12 may be planar or may be approximately planar surfaces. For example, the approximately planar surfaces allow for presence of bumps or depressions due to manufacturing processes. The second surface M2 may be parallel to the fourth surface M4.

In some examples, as shown in FIGS. 3 and 4, the plurality of first dimming portions 130 of the first prism sheet 11 may be continuously distributed in a direction perpendicular to the first direction D1, for example, end portions of first extension surfaces of two adjacent first dimming portions 130 are connected to each other. In some other examples, the plurality of first dimming portions 130 may be spaced in the direction perpendicular to the first direction D1, that is, end portions of the first extension surfaces of two adjacent first dimming portions 140 may not be connected to each other. This embodiment is not limited thereto.

In some examples, as shown in FIGS. 3 and 5, the plurality of second dimming portions 140 of the second prism sheet 12 may be continuously distributed in a direction perpendicular to the second direction D2, for example, end portions of the second extended surfaces of two adjacent second dimming portions 140 are connected to each other. In some other examples, the plurality of second dimming portions 140 may be spaced in the direction perpendicular to the second direction D2, that is, end portions of the second extension surfaces of two adjacent second dimming portions 140 may not be connected to each other. This embodiment is not limited thereto.

In some examples, as shown in FIG. 4, a distance between the first intersection lines 133 of two adjacent first dimming portions 130 may be a first dimming pitch L1 of the first prism sheet. As shown in FIG. 4, a distance between the second intersection lines 143 of two adjacent second dimming portions 140 may be a second dimming pitch L2 of the second prism sheet. The first dimming pitch L1 and the second dimming pitch L2 may be substantially the same. For example, the first dimming pitch L1 and the second dimming pitch L2 may range from 25 microns to 50 microns. For example, it may be 30 microns to 45 microns. By providing the dimming pitches being greater than or equal to 25 microns, sensitivity of the prism sheets to foreign bodies may be ensured.

In some examples, as shown in FIG. 4, the first prism sheet 11 may include a first substrate 110, a first prism layer located on a side of the first substrate 110, and a first coating 111 located on a side of the first substrate 110 away from the first prism layer. The first prism layer may include a plurality of first dimming portions 130. The second surface M2 of the first prism sheet 11 may be a surface of the first coating 111 away from the first substrate 110. The first coating 111 may be configured to provide protection, and enhance wear resistance and scratch resistance, so as to prevent damages to the first prism layer.

In some examples, as shown in FIG. 5, the second prism sheet 12 may include a second substrate 120, a second prism layer located on a side of the second substrate 120, and a second coating 121 located on a side of the second substrate 120 away from the second prism layer. The second prism layer may include a plurality of second dimming portions 140. The fourth surface M4 of the second prism sheet 12 may be a surface of the second coating 121 away from the second substrate 120. The second coating 121 may be configured to provide protection, and enhance wear resistance and scratch resistance, so as to prevent damages to the second prism layer.

In some examples, the first substrate 110 and the second substrate 120 may be made of a Polyethylene Terephthalate (PET) material, which has good transparency and maximum toughness among thermoplastics to ensure structural firmness of the prism sheets. In addition, the PET material has good electrical insulation performance and is less affected by temperature, which may ensure the stability of the optical properties of the prism sheets.

In some examples, materials of the first coating 111 and the second coating 121 may be a variety of resin-based polymers, such as polyethylene, polystyrene and other materials. Resin polymer has good transparency, which may ensure optical performance of the prism sheets. In this example, hazes of the first prism sheet 11 and the second prism sheet 12 may be adjusted by providing the first coating and the second coating. Haze (haze) is a percentage of a transmitted light intensity that deviates from the incident light at an angle of 2.5° or more to a total transmitted light intensity. The greater the haze, the lower the gloss and transparency of the film, especially the lower the imaging sharpness.

In some examples, the haze of the first prism sheet may range from 10% to 45%, for example, from 15% to 30%. By providing the haze of the first prism sheet to be greater than or equal to 15%, shielding property of the first prism sheet may be ensured, and by providing the haze of the first prism sheet to be less than or equal to 30%, a large brightness loss may be avoided. The haze of the second prism sheet may range from 10% to 45%, for example, from 25% to 45%. By providing the haze of the second prism sheet to be greater than or equal to 25%, the viewing angle standard of TCO may be ensured, and by providing the haze of the second prism sheet to be less than or equal to 45%, a large brightness loss may be avoided. For example, the haze of the first prism sheet may be 15%, and the haze of the second prism sheet may be 40%.

In some examples, refractive indices of the first dimming portions 130 and the second dimming portions 140 may be 1.45 to 1.7, for example, 1.52 to 1.61. In some examples, the first dimming portions 130 and the second dimming portions 140 may be made of a same material, and have the same refractive index. In some other examples, the first dimming portions 130 and the second dimming portions 140 may have different refractive indices. This embodiment is not limited thereto. By providing the refractive indices of the dimming portions to be less than or equal to 1.61, the scratch resistance of the prism sheets may be ensured.

In some examples, viewing angle is one of important specifications of a display device, and TCO international standards have clear requirements on viewing angles. Viewing angles may include Horizontal Viewing Angle and Vertical Viewing Angle. Horizontal viewing angle refers to a range that can be observed from the left side to the right side of a display screen in the horizontal direction. Horizontal viewing angle can indicate a width range that users can see contents on the screen when using the display normally. Vertical viewing angle refers to a range that can be observed from the top to the bottom of a display screen in the vertical direction. Vertical viewing angle can indicate a height range that users can see contents on the screen when using the display normally.

Figure 8A:
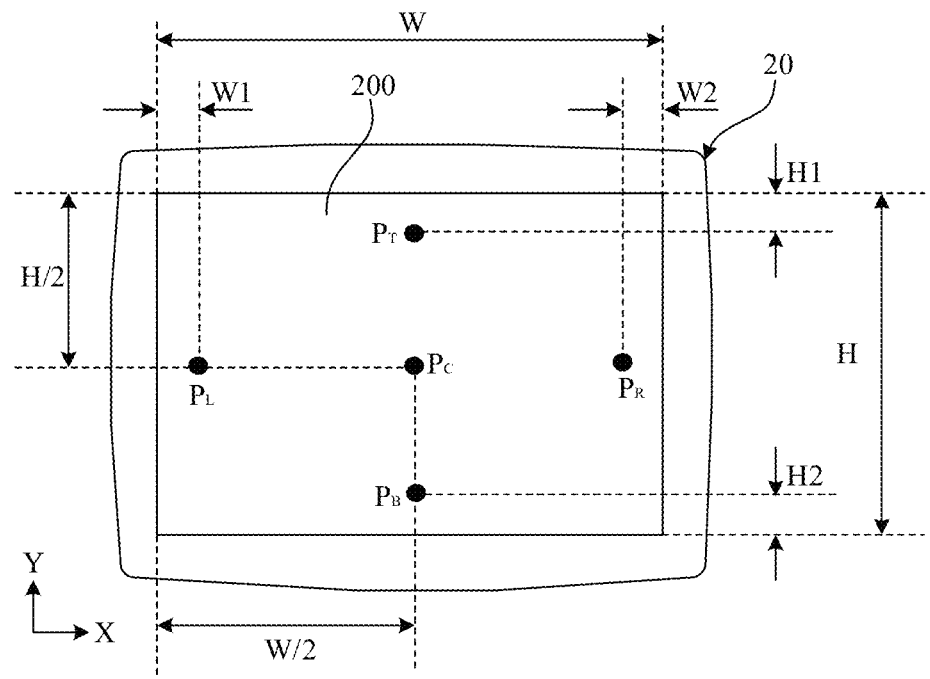
FIG. 8A is a schematic diagram of a display area of a liquid crystal panel according to at least one embodiment of the present disclosure.
Figure 8B:
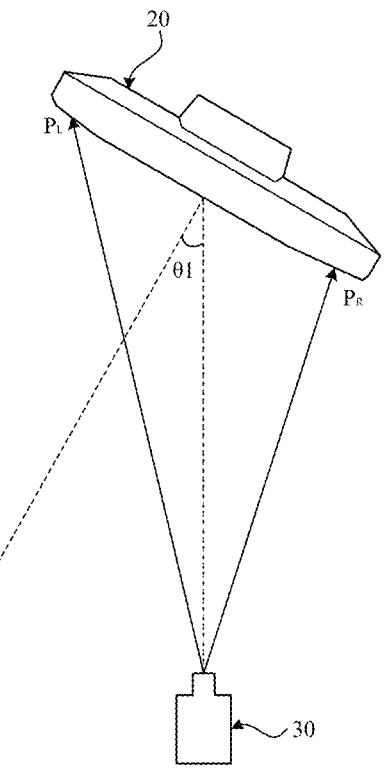
FIG. 8B is an observation view of the liquid crystal panel shown in FIG. 8A when measuring a horizontal viewing angle.
Figure 8C:
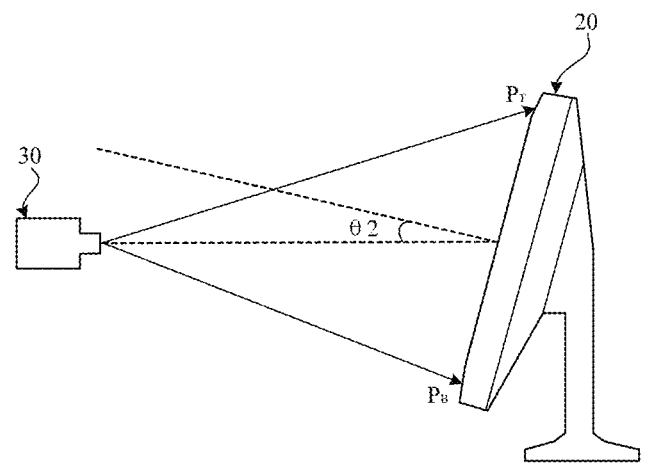
FIG. 8C is an observation view of the liquid crystal panel shown in FIG. 8A when measuring a vertical viewing angle.

FIG. 8A is a schematic diagram of a display area of a liquid crystal panel according to at least one embodiment of the present disclosure. FIG. 8B is an observation view of the liquid crystal panel shown in FIG. 8A when measuring a horizontal viewing angle. FIG. 8C is an observation view of the liquid crystal panel shown in FIG. 8A when measuring a vertical viewing angle.

In some examples, as shown in FIGS. 8A to 8C, the liquid crystal panel 20 may have a rectangular display area 200. This example uses a camera 30 for viewing angle measurement. A viewing distance between the camera 30 and the liquid crystal panel 20 (i.e., a vertical distance between the camera 30 and the liquid crystal panel 20) may be a common viewing distance, for example, it may be about 1 meter.

In some examples, as shown in FIG. 8A, a display area 200 may have a first position $P_L$, a second position $P_R$, a third position $P_T$, a fourth position $P_B$ and a center position $P_C$. The first position $P_L$ and the second position $P_R$ may be respectively located on two sides, i.e., left side and right side, of the center position $P_C$ in the third direction $X_C$. The first position $P_L$ and the second position $P_R$ may be located on a center line of the display area 200 in the fourth direction Y. The third position $P_T$ and the fourth position $P_B$ may be respectively located on two sides, i.e., upper side and lower side, of the center position $P_C$ in the fourth direction $Y_C$. The third position $P_T$ and the fourth position $P_B$ may be located on a center line of the display area 200 in the third direction X.

In some examples, a length of the display area 200 in the third direction X may be W. A distance between the first position $P_L$ and a boundary (e.g., left boundary) of the display area 200 in the third direction X is W1. A distance between the second position $P_R$ and the other boundary (e.g., right boundary) of the display area 200 in the third direction X may be W2. W1 may be equal to W2, for example, both are W/10.

In some examples, a length of the display area 200 in the fourth direction Y may be H. A distance between the third position $P_T$ and one boundary (e.g., upper boundary) of the display area 200 in the fourth direction Y may be H1. A distance between the fourth position $P_B$ and the other boundary (e.g., lower boundary) of the display area 200 in the fourth direction Y may be H2. H1 may be equal to H2, for example, both are H/10.

In some examples, when viewing the liquid crystal panel 20 using the camera 30, a frequency and a range of moving leftward and rightward are generally larger than a frequency and a range of moving upward and downward, and therefore the horizontal viewing angle of the liquid crystal panel 20 should be as larger as possible than the vertical viewing angle. When the camera 30 moves leftward and rightward and an angle θ1 between a sight line and the central axis of the display area 200 is 30 degrees, if a brightness difference viewed between two opposite positions (i.e., the first position $P_L$ and the second position $P_R$) of the display area 200 in the third direction X is greater than a preset value, it is considered that the viewing angle of the liquid crystal panel 20 in the horizontal direction is small and does not meet the requirement on horizontal viewing angle. When the camera 30 moves upward or downward and an angle θ2 between the sight line and the central axis of the display area 200 is 15 degrees, if a brightness difference viewed between two opposite positions (i.e., the third position $P_T$ and the fourth position $P_B$) of the display area 200 in the fourth direction Y is greater than a preset value, it is considered that the viewing angle of the liquid crystal panel 20 in the vertical direction is small and does not meet the requirement on vertical viewing angle. In some examples, the preset value may be 1.73, for example.

In some examples, a TCO horizontal viewing angle uniformity $A_{Horizontal}$, a first TCO vertical viewing angle uniformity $A_{Vertical\ 1}$, and a second TCO vertical viewing angle uniformity $A_{Vertical\ 2}$ may be calculated by the following formulas:

$$A_{Horizontal} = \frac{\left(\frac{L_{max+30°}}{L_{min+30°}}\right) + \left(\frac{L_{max-30°}}{L_{min-30°}}\right)}{2};$$

$$A_{Vertical1} = \frac{L_{max+15°}}{L_{min+15°}}; \text{ and}$$

$$A_{Vertical2} = \frac{L_{max-15°}}{L_{min-15°}};$$

where $L_{max+30°}$ represents a maximum brightness value measured when the observation angle θ1 is 30 degrees, and $L_{min+30°}$ represents a minimum brightness value measured when the observation angle θ1 is 30 degrees. $L_{max-30°}$ represents a maximum brightness value measured when the observation angle θ1 is −30 degrees, and $L_{min-30°}$ represents a minimum brightness value measured when the observation angle θ1 is −30 degrees. $L_{max+15°}$ represents a maximum brightness value measured when the observation angle θ2 is 15 degrees, and $L_{min+15°}$ represents the minimum brightness value measured when the observation angle θ2 is 15 degrees. $L_{max-15°}$ represents a maximum brightness value measured when the observation angle θ2 is −15 degrees, and $L_{min-15°}$ represents a minimum brightness value measured when the observation angle θ2 is −15 degrees.

In some examples, the larger one of the first TCO vertical viewing angle uniformity $A_{Vertical\ 1}$ and the second TCO vertical viewing angle uniformity $A_{Vertical\ 2}$ may be selected as a TCO vertical viewing angle uniformity.

Based on testing principles of TCO horizontal viewing angle and TCO vertical viewing angle, in order to facilitate simulation, calculation of TCO viewing angle uniformity described above may be transformed into a brightness ratio of a center point under different viewing angles.

In some examples, horizontal viewing angles ∠A and ∠B may be calculated by the following formulas:

$$\angle A = 90° - \tan^{-1}\left(\frac{1.5D \times \sin 60°}{1.5D \times \cos 60° - 0.4H}\right); \text{ and}$$

$$\angle B = 90° - \tan^{-1}\left(\frac{1.5D \times \sin 60°}{1.5D \times \cos 60° + 0.4H}\right).$$

In some examples, vertical viewing angles ∠E and ∠F may be calculated by the following formulas:

$$\angle E = 90° - \tan^{-1}\left(\frac{1.5D \times \sin 75°}{1.5D \times \cos 75° - 0.4W}\right); \text{ and}$$

$$\angle F = 90° - \tan^{-1}\left(\frac{1.5D \times \sin 75°}{1.5D \times \cos 75° + 0.4W}\right);$$

where D represents a diagonal dimension of the liquid crystal panel, H is a length of the liquid crystal panel in the fourth direction Y, and W is a length of the liquid crystal panel in the third direction X.

According to the above formulas, the horizontal viewing angle and vertical viewing angle required for brightness test may be calculated for liquid crystal panels with different sizes, and then the TCO viewing angle uniformity may be calculated according to the brightness under the horizontal viewing angle and vertical viewing angle, so as to judge whether the viewing angle requirements of TCO are met.

In some examples, the TCO viewing angle uniformity (including a TCO horizontal viewing angle uniformity $A_{Horizontal}$, a first TCO vertical viewing angle uniformity $A_{Vertical\ 1}$, and a second TCO vertical viewing angle uniformity $A_{Vertical\ 2}$) of the corresponding liquid crystal panel may be calculated according to the following formulas.

$$A_{Horizontal} = \frac{\left(\frac{L_{+LA}}{L_{+LB}}\right) + \left(\frac{L_{-LA}}{L_{-LB}}\right)}{2};$$

$$A_{Vertical1} = \frac{L_{+LE}}{L_{+LF}}; \text{ and}$$

$$A_{Vertical2} = \frac{L_{-LE}}{L_{-LF}};$$

The following describes an effect of a DBEF on emitted light of the dimming assembly.

Figure 9A:
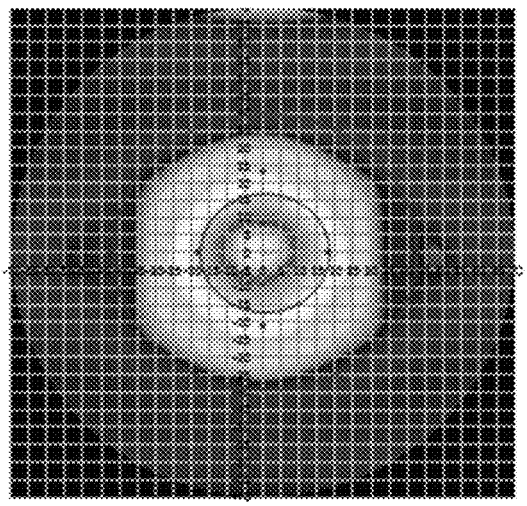
FIG. 9A is a full-view distribution diagram of a backlight module based on a DPP architecture.
Figure 9B:
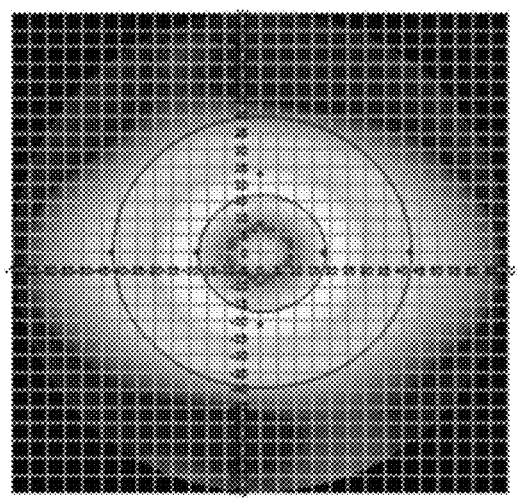
FIG. 9B is a full-view distribution diagram of a backlight module based on a DBEF+DPP architecture.

FIG. 9A is a full-view distribution diagram of a backlight module based on a DPP architecture. FIG. 9B is a full-view distribution diagram of a backlight module based on a DBEF+DPP architecture. A dimming assembly of the backlight module corresponding to FIG. 9A includes a diffuser, a second prism sheet, and a first prism sheet which are stacked, and the stacked structure may be referred to as a DPP (Diffuer+Prism+Prism) structure. A first cutting angle of a first prism sheet is 0 degrees, and a second cutting angle of a second prism sheet is 90 degrees. A dimming assembly of the corresponding backlight module of FIG. 9B includes a diffuser, a second prism sheet, a first prism sheet, and a DBEF which are stacked, and the stacked structure may be referred to as a DPP structure combined with the DBEF (i.e., a DBEF+DPP architecture). The first cutting angle of the first prism sheet is 0 degrees, and the second cutting angle of the second prism sheet is 90 degrees.

Figure 10:
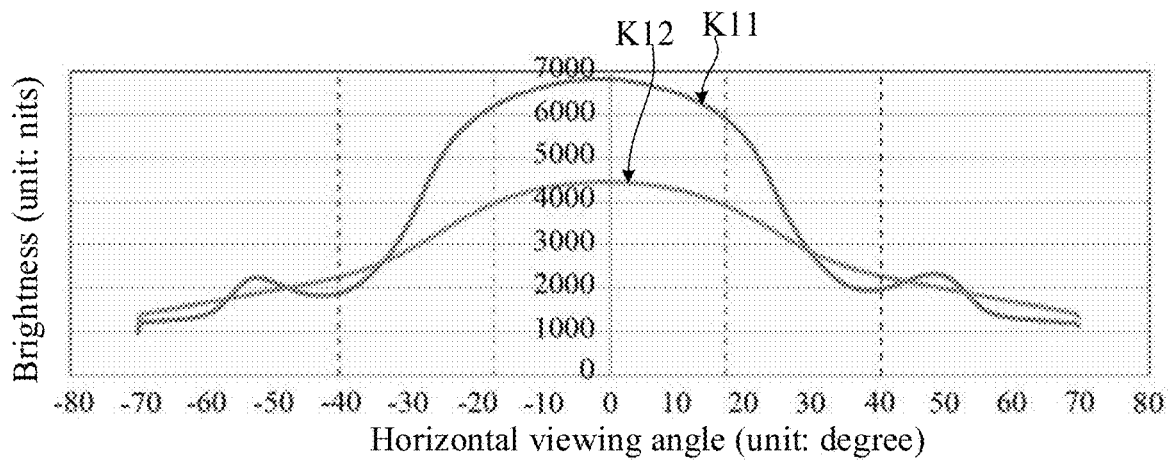
FIG. 10 is a comparison diagram of brightness curves of a backlight module based on a DPP architecture and a backlight module based on a DBEF+DPP architecture.

FIG. 10 is a comparison diagram of brightness curves of a backlight module based on a DPP architecture and a backlight module based on a DBEF+DPP architecture. In FIG. 10, the abscissa represents the horizontal viewing angle, and the ordinate represents the brightness in nits. Curve K11 in FIG. 10 is a brightness curve of a backlight module based on a DPP architecture, and curve K12 is a brightness curve of a backlight module based on the DBEF+DPP architecture.

As can be seen from FIGS. 9A, 9B, and 10, after the DBEF is provided, a brightness difference between different viewing angles is reduced, and the brightness curve in the horizontal viewing angle tends to be smooth. A brightness peak at a horizontal viewing angle of about 50 degrees disappears, which may improve the TCO horizontal viewing angle uniformity.

Figure 11:
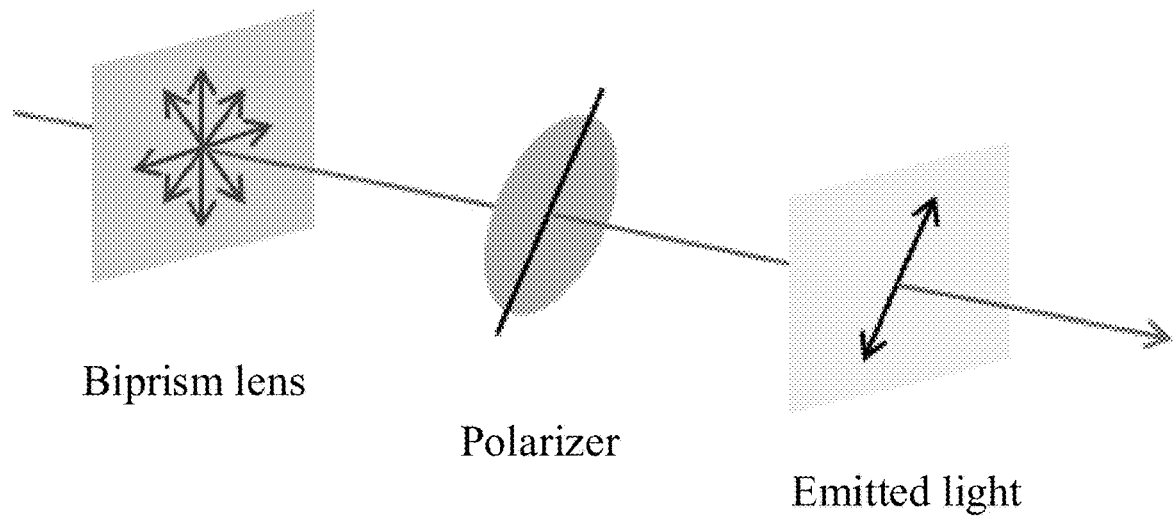
FIG. 11 is a test diagram of polarized light intensity.

FIG. 11 is a test diagram of polarized light intensity. In some examples, a polarizer (POL) is covered on a light-emitting side of the backlight module based on DPP structure, the polarizer is rotated and brightness of a center point at a front viewing angle (i.e., a 0-degree viewing angle) is tested, to test a polarized light intensity of the backlight module at different cutting angles of the prism sheet.

Figure 12A:
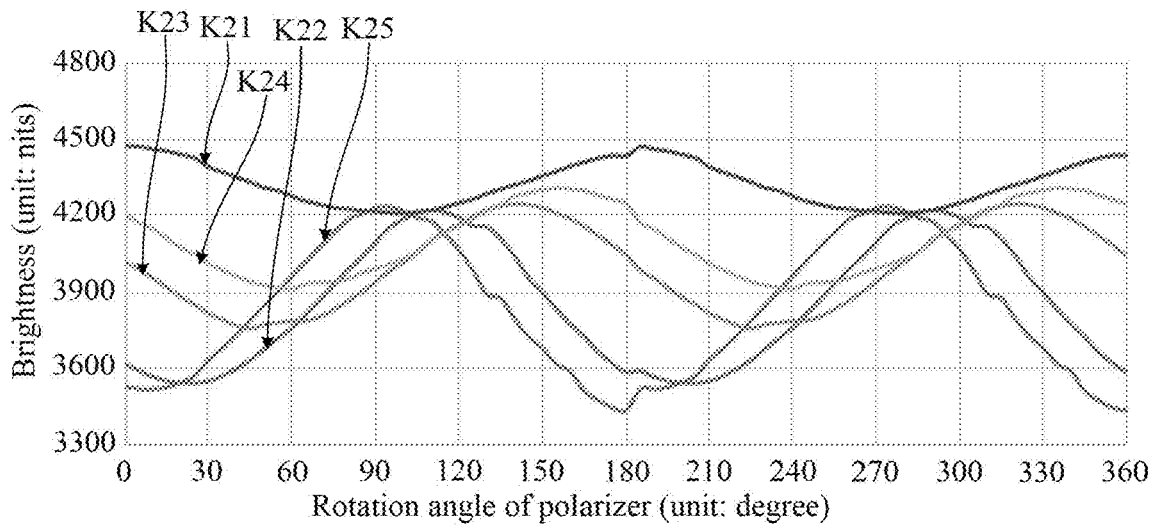
FIG. 12A is a brightness curve of a backlight module based on a DPP architecture with respect to rotation of a polarizer.
Figure 12B:
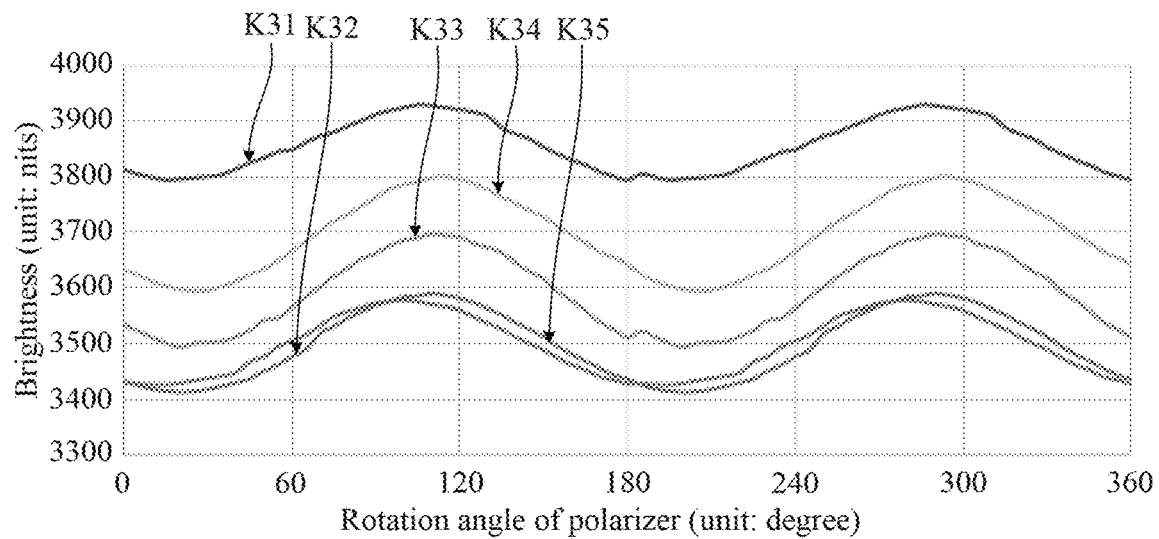
FIG. 12B is a brightness curve of a backlight module based on a DBEF+DPP architecture with respect to rotation of a polarizer.

FIG. 12A is a brightness curve of a backlight module based on a DPP architecture with respect to rotation of a polarizer. FIG. 12B is a brightness curve of a backlight module based on a DBEF+DPP architecture with respect to rotation of a polarizer. In FIGS. 12A and 12B, the abscissa represents a rotation angle of the polarizer, and the ordinate represents brightness in nits.

In FIG. 12A, curve K21 represents a brightness curve of a backlight module in which cutting angles of the first prism sheet and the second prism sheet are both 0 degrees. Curve K22 represents a brightness curve of a backlight module in which the cutting angle of the first prism sheet is 15 degrees and the cutting angle of the second prism sheet is 0 degrees. Curve K23 represents a brightness curve of a backlight module in which the cutting angle of the first prism sheet is 45 degrees and the cutting angle of the second prism sheet is 0 degrees. Curve K24 represents a brightness curve of a backlight module in which the cutting angle of the first prism sheet is 60 degrees and the cutting angle of the second prism sheet is 0 degrees. Curve K25 represents a brightness curve of a backlight module in which the cutting angle of the first prism sheet is 90 degrees and the cutting angle of the second prism sheet is 0 degrees.

In FIG. 12B, curve K31 represents a brightness curve of a backlight module in which the cutting angles of the first prism sheet and the second prism sheet are both 0 degrees. Curve K32 represents a brightness curve of a backlight module in which the cutting angle of the first prism sheet is 0 degrees and the cutting angle of the second prism sheet is 15 degrees. Curve K33 represents a brightness curve of a backlight module in which the cutting angle of the first prism sheet is 0 degrees and the cutting angle of the second prism sheet is 45 degrees. Curve K34 represents a brightness curve of a backlight module in which the cutting angle of the first prism sheet is 0 degrees and the cutting angle of the second prism sheet is 60 degrees. Curve K35 represents a brightness curve of a backlight module in which the cutting angle of the first prism sheet is 0 degrees and the cutting angle of the second prism sheet is 90 degrees.

As the angle of the polarizer changes, brightness of emitted light changes periodically, which is consistent with the formula of Marius' law:

$$I = I_0 + I_1 \cos(\theta - \beta)^2,$$

where I represents the brightness of the emitted light, $I_0$ represents natural light, which is one-half of the brightness of natural light; $I_1$ represents the brightness of linearly polarized light; $\theta$ is an angle of the polarizer; $\beta$ is a peak phase, $\beta$=Up Prism+95°, Up Prism represents the cutting angle of the first prism sheet.

By comparing FIG. 12A and FIG. 12B, it can be found that in the backlight module without DBEF, the brightness peaks continuously shift in phase with the change of the cutting angle of the first prism sheet. After a DBEF is disposed in the backlight module, the brightness peaks are fixed at 0 degrees, 90 degrees and 180 degrees regardless of a change of the included angle between the first prism sheet and the second prism sheet (i.e., a difference between the cutting angles of the first prism sheet and the second prism sheet). It can be shown that the DBEF completely changes a polarization form of the emitted light, and changes partially polarized light with natural light as the main component into partially polarized light with linear polarized light as the main component.

According to the above analysis, the DBEF is generally beneficial to improvement of viewing angle. After analyzing and determining influence of various parameters of the two prism sheets on brightness and viewing angle under DBEF, a best match may be selected to meet requirements of both viewing angle and brightness.

The following analysis explains influence of a single parameter of the prism sheet on the TCO viewing angle and brightness of the backlight module.

In some examples, according to a simulation test, the higher a refractive index of dimming portions of a prism sheet, the better the brightness enhancement effect. Considering reliability factors such as scratch resistance of actual products in use, a material with a refractive index ranging from 1.45 to 1.7 may be selected for the dimming portions of the first prism sheet and the dimming portions of the second prism sheet. Ranges of the refractive indices selected in this example not only ensures reliability, but also does not require a protective film during actual transportation and does not increase costs of the film.

In some examples, considering actual product specifications and actual generation feasibility, a first dimming pitch of the first prism sheet and a second dimming pitch of the second prism sheet may range from 25 microns to 50 microns, for example, 30 microns to 45 microns. Ranges of the dimming pitches selected in this example may avoid deterioration of sensitivity to foreign bodies.

Figure 13A:
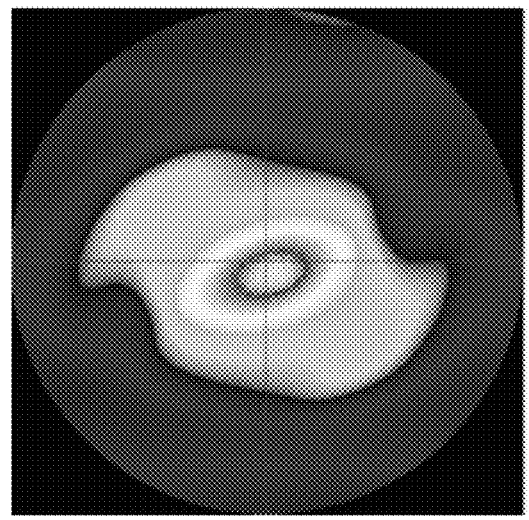
FIG. 13A is a full-view distribution diagram of haze variation of a first prism sheet of a backlight module based on a DPP architecture.
Figure 13B:
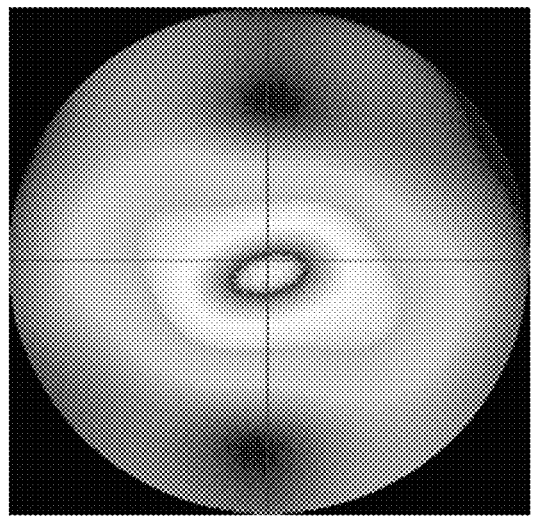
FIG. 13B is a full-view distribution diagram of haze variation of a first prism sheet of a backlight module based on a DBEF+DPP architecture.
Figure 14A:
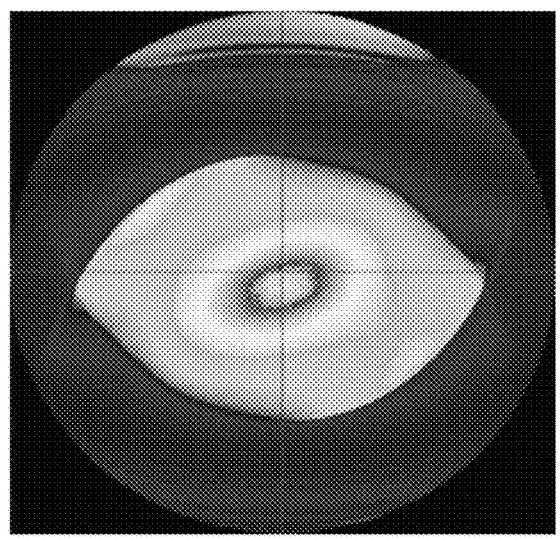
FIG. 14A is a full-view distribution diagram of haze variation of a second prism sheet of a backlight module based on a DPP architecture.
Figure 14B:
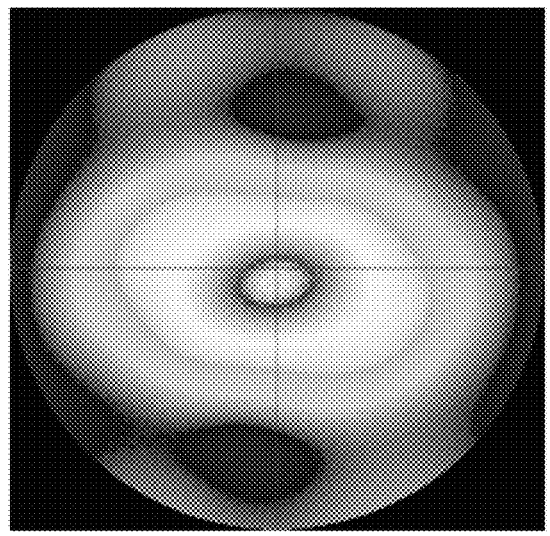
FIG. 14B is a full-view distribution diagram of haze variation of a second prism sheet of a backlight module based on a DBEF+DPP architecture.

FIG. 13A is a full-view distribution diagram of haze variation of a first prism sheet of a backlight module based on a DPP architecture. FIG. 13B is a full-view distribution diagram of haze variation of a first prism sheet of a backlight module based on a DBEF+DPP architecture. FIG. 14A is a full-view distribution diagram of haze variation of a second prism sheet of a backlight module based on a DPP architecture. FIG. 14B is a full-view distribution diagram of haze variation of a second prism sheet of a backlight module based on a DBEF+DPP architecture.

In some examples, as shown in FIGS. 13A to 14B, it can be seen by comparing the full-view distribution diagrams under different hazes of prism sheets that an effect produced by changing the haze of the first prism sheet is not completely consistent with an effect produced by changing the haze of the second prism sheet. By changing the haze of the first prism sheet, the brightness distribution in the whole viewing angle may be compressed, and a high brightness area is transformed into a low brightness area, thus the whole viewing angle tends to be soft, which has little influence on the uniformity of TCO viewing angle. By changing the haze of the second prism sheet, central brightness is transformed to around 40 degrees (this angle may be controlled by the included angle between the first prism and the second prism), which has a great influence on the uniformity of TCO viewing angle.

Upon comparison of actual test data, viewing angle and brightness may both be met by choosing a match of the first prism sheet with a haze of 15% and the second prism sheet with a haze of 40%. In some other examples, when the requirement for TCO viewing angle uniformity of the liquid crystal panel becomes low, the haze of the second prism sheet may be appropriately reduced to obtain more brightness gain.

In some examples, the included angle between the first prism sheet and the second prism sheet (i.e., an included angle between the first direction in which the first dimming portions of the first prism sheet extends and the second direction in which the second dimming portions of the second prism sheet extends) is a key parameter affecting the performance of brightness and viewing angle. Since the DBEF is sensitive to a polarization state of incident light, when a main polarization direction of incident light is parallel to a transmission direction of a DBEF, more light passes through the DBEF.

Figure 15:
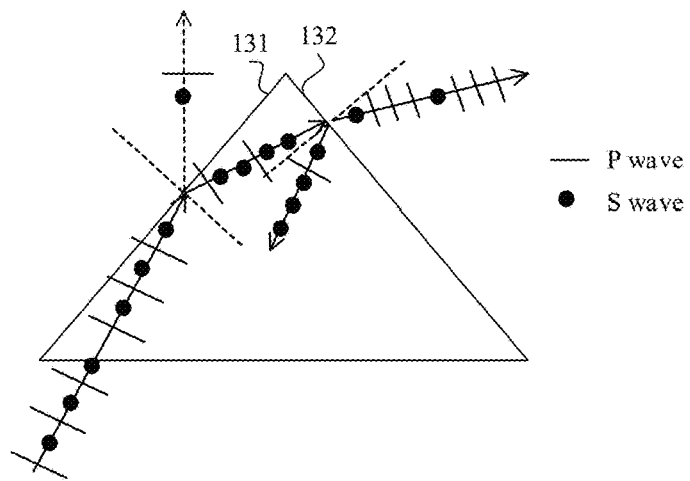
FIG. 15 is a schematic diagram of light emitted from a first prism sheet.

FIG. 15 is a schematic diagram of light emitted from a first prism sheet. In some examples, there are multiple refractions and reflections between the first dimming portions of the first prism sheet and the air, resulting in certain polarization characteristics of the emitted light. As shown in FIG. 15, P-wave and S-wave of the incident light incident on the first extension surface 131 of the first light dimming portion may be approximately the same, the P-wave of the reflected light after being reflected on the first extension surface 131 is smaller than the S-wave, and the reflected wave is reflected again on the first extension surface 132 and enters the air through refraction. The P wave of the reflected wave on the second extension surface 132 is smaller than the S wave. The P wave of the refracted light on the first extension surface 132 is larger than the S wave. As can be seen, the main polarization direction of the light emitted from the first prism sheet is perpendicular to the extension direction of the first dimming portion.

Figure 16:
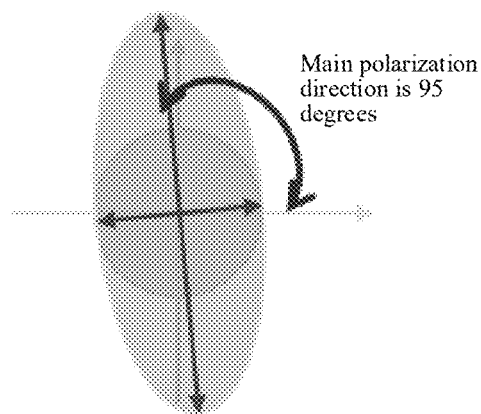
FIG. 16 is a schematic diagram of a main deflection direction of emitted light.

FIG. 16 is a schematic diagram of a main deflection direction of emitted light. In some examples, a polarizer is disposed on a light-emitting side of the backlight module of the DPP architecture, and the brightness change of the emitted light is detected by rotating the polarizer. It is found through experiments that there is always a phase difference of 5 degrees between the highest linear polarization intensity and the cutting angle of the first prism sheet. As shown in FIG. 16, the main polarization direction of the emitted light is 95 degrees. The inclined lateral axis in FIG. 16 represents a natural light portion of the emitted light, and the inclined vertical axis represents a polarized light portion of the emitted light. Horizontal lateral axis may represent horizontal line.

Based on the above analysis, it can be seen that the absolute value of the cutting angle of the first prism sheet may range from 0 degrees to 15 degrees to achieve further brightness gain. For example, the absolute value of the cutting angle of the first prism sheet may range from 3 degrees to 10 degrees. It is found through tests and researches that when the cutting angle of the first prism sheet is 15 degrees and the cutting angle of the second prism sheet is 90 degrees, the brightness gain of the backlight module is the largest but the TCO viewing angle uniformity is the worst; and when the cutting angle of the first prism sheet is 5 degrees and the cutting angle of the second prism sheet is 40 degrees, the TCO viewing angle uniformity of the backlight module is the best but the brightness is the lowest. Upon the comparative analysis of collocating products, it can be seen that the absolute value range of the cutting angle of the second prism sheet may be 60 degrees to 75 degrees. For example, the absolute value of the cutting angle of the second prism sheet may range from 65 degrees to 70 degrees. The range of the angle of the second prism sheet in this example may avoid serious loss of brightness when it is below 60 degrees, and avoid failure to meet the TCO viewing angle requirements when it is above 75 degrees.

In some examples, a plurality of comparison structures is compared with the structure of the dimming assembly of this example. The dimming assembly of this example may include a diffuser, a second prism sheet, a first prism sheet, and a DBEF which are stacked, wherein a cutting angle of the first prism sheet may be 5 degrees, and a cutting angle of the second prism sheet may be 75 degrees. The dimming assembly of comparison structure 1 may adopt a DP+DBEF architecture, and may include a diffuser, a prism sheet and a DBEF which are stacked, wherein an included angle between two extension surfaces of the dimming portion of the prism sheet may be 90 degrees, and no filleted corner is formed at a connecting position of the two extension surfaces. The dimming assembly of comparison structure 2 may adopt a DP+DBEF architecture, and may include a diffuser, a prism sheet and a DBEF which are stacked, wherein an included angle between two extended surfaces of the dimming portion of the prism sheet may be 90 degrees, and a filleted corner is formed at a connecting position of the two extended surfaces. The dimming assembly of comparison structure 3 may adopt a DDP+DBEF architecture and may include a first diffuser, a second diffuser, a prism sheet and a DBEF which are stacked.

According to the test results, compared with the comparison structure 1, the brightness of the dimming assembly in this example is improved by about 3.94%; compared with the comparison structure 2, the brightness of the dimming assembly in this example is improved by about 2.43%; and compared with the comparison structure 3, the brightness of the dimming assembly in this example is improved by about 8.76%. It can be seen that the dimming module of this example may achieve a brightness gain of 2% to 8% compared with the dimming assembly with a single prism and DBEF architecture. The dimming assembly of this example may improve the brightness while meeting the viewing angle requirements of TCO.

Figure 17:
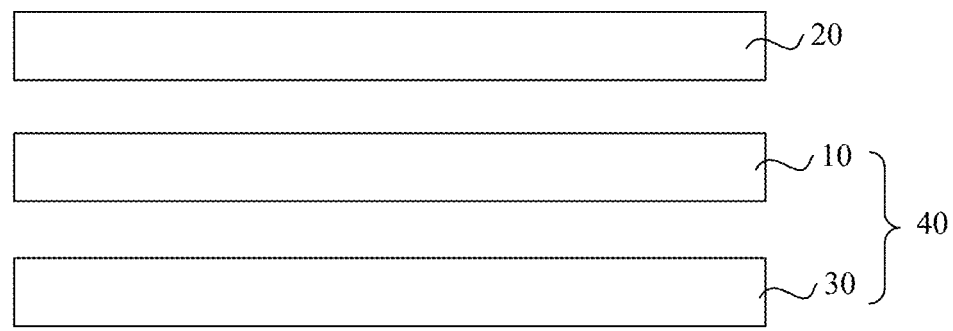
FIG. 17 is a schematic diagram of a display device according to at least one embodiment of the present disclosure.

FIG. 17 is a schematic diagram of a display device according to at least one embodiment of the present disclosure. In some examples, as shown in FIG. 17, the display device may include a backlight module 40 and a liquid crystal panel 20 located on a light-emitting side of the backlight module 40. The backlight module 40 may include a light source module 30 and a dimming assembly 10. The dimming assembly 10 may be located between the liquid crystal panel 20 and the light source assembly 30. A structure of the dimming assembly 10 may be as described in the foregoing embodiments. The light source assembly 30 is configured to generate light directed towards the dimming assembly 10. The light emitted from the light source assembly 30 may sequentially pass through a second prism sheet and a first prism sheet of the dimming assembly 10 and be directed towards the liquid crystal panel 20. In some examples, the light source assembly may adopt a back-in light source or a side-in light source. This embodiment is not limited thereto. The backlight module and the display device of this example have advantages of small thickness, high gain and wide viewing angle.

In some examples, as shown in FIG. 17, the liquid crystal panel 20 may mainly include an array substrate, a cell-alignment substrate and a liquid crystal layer between the array substrate and the cell-alignment substrate. Types of the liquid crystal panel 20 may include a VA type, an IPS type, a TN type, and the like. This embodiment is not limited thereto.

In some examples, the display device may be a mobile device, such as a smart phone, tablet computer, notebook computer, etc. The display device may be a wearable terminal, such as a smart watch, a smart bracelet, a smart eye, an augmented reality device, etc. The display device may be a fixed terminal, such as a desktop computer, a television, etc.

The drawings of the present disclosure only involve structures involved in the present disclosure, and other structures may refer to conventional designs. The embodiments of the present disclosure, i.e., features in the embodiments, may be combined with each other to obtain new embodiments if there is no conflict. It should be noted that the above embodiments or implementations are exemplary rather than restrictive. Therefore, the present disclosure is not limited to what is specifically shown and described herein. Various modifications, substitutions or omissions may be made to the form and details of implementation without departing from the scope of the present disclosure.

The invention claimed is:

1. A dimming assembly, comprising:
a first prism sheet and a second prism sheet disposed oppositely; the first prism sheet has a first surface and a second surface which are opposite to each other, wherein the first surface comprises a plurality of first dimming portions extending in a first direction and arranged in an array;
the second prism sheet has a third surface and a fourth surface which are opposite to each other, wherein the third surface is located on a side of the second prism sheet close to the first prism sheet, and the third surface comprises a plurality of second dimming portions extending in a second direction and arranged in an array; and
an auxiliary film located on a side of the first prism sheet away from the second prism sheet;
wherein the first prism sheet further has at least one first side surface extending in a third direction and connecting the first surface with the second surface, and the second prism sheet further has at least one second side surface extending in the third direction and connecting the third surface with the fourth surface; an included angle between the third direction and the first direction is a first cutting angle of the first prism sheet, and an included angle between the third direction and the second direction is a second cutting angle of the second prism sheet; and
an absolute value of the second cutting angle of the second prism sheet is greater than an absolute value of the first cutting angle of the first prism sheet, and the absolute values of the first cutting angle and the second cutting angle are greater than or equal to 0 and less than 90 degrees.

2. The dimming assembly according to claim 1, wherein the absolute value of the first cutting angle is greater than or equal to 0 and less than or equal to 15 degrees.

3. The dimming assembly according to claim 2, wherein the absolute value of the first cutting angle is greater than or equal to 3 degrees and less than or equal to 10 degrees.

4. The dimming assembly according to claim 2, wherein a difference between the absolute value of the first cutting angle and the absolute value of the second cutting angle ranges from 45 degrees to 75 degrees.

5. The dimming assembly according to claim 4, wherein the absolute value of the second cutting angle is greater than or equal to 60 degrees and less than or equal to 75 degrees.

6. The dimming assembly according to claim 5, wherein the absolute value of the second cutting angle is greater than or equal to 65 degrees and less than or equal to 70 degrees.

7. The dimming assembly according to claim 1, wherein the first cutting angle is 5 degrees and the second cutting angle is 75 degrees.

8. The dimming assembly according to any one claim 1, wherein a haze of the first prism sheet and a haze of the second prism sheet both range from 10% to 45%, and the haze of the first prism sheet is less than the haze of the second prism sheet.

9. The dimming assembly according to claim 8, wherein the haze of the first prism sheet ranges from 15% to 30%, and the haze of the second prism sheet ranges from 25% to 45%.

10. The dimming assembly according to claim 9, wherein the haze of the first prism sheet is 15% and the haze of the second prism sheet is 40%.

11. The dimming assembly according to claim 1, wherein each first dimming portion of the first prism sheet has two first extension surfaces extending in the first direction; in a cross section perpendicular to the second surface and perpendicular to the first direction, end portions of the two first extension surfaces away from the second surface intersect to form a first intersection line; and a distance between adjacent first intersection lines is a first dimming pitch;

each second dimming portion of the second prism sheet has two second extension surfaces extending in the second direction; in a cross section perpendicular to the fourth surface and perpendicular to the second direction, end portions of the two second extension surfaces away from the fourth surface intersect to form a second intersection line; and a distance between adjacent second intersection lines is a second dimming pitch; and each of the first dimming pitch and the second dimming pitch ranges from 25 microns to 50 microns.

12. The dimming assembly according to claim 11, wherein each of the first dimming pitch and the second dimming pitch ranges from 30 microns to 45 microns.

13. The dimming assembly according to claim 1, wherein each first dimming portion of the first prism sheet has two first extension surfaces extending in the first direction; in a cross section perpendicular to the second surface and perpendicular to the first direction, an included angle between the two first extension surfaces ranges from 87 degrees to 92 degrees; each second dimming portion of the second prism sheet has two second extension surfaces extending in the second direction; and in a cross section perpendicular to the fourth surface and perpendicular to the second direction, an included angle between the two second extension surfaces ranges from 87 degrees to 92 degrees.

14. The dimming assembly according to claim 1, wherein refractive indices of the first dimming portions of the first prism sheet and the second dimming portions of the second prism sheet range from 1.45 to 1.7.

15. The dimming assembly according to claim 14, wherein the refractive indices of the first dimming portions of the first prism sheet and the second dimming portions of the second prism sheet range from 1.52 to 1.61.

16. The dimming assembly according to claim 1, further comprising: a diffuser located on a side of the second prism sheet away from the first prism sheet, and configured to diffuse transmitted light and direct diffused light toward the second prism sheet.

17. A backlight module, comprising a light source assembly and the dimming assembly according to claim 1, wherein the light source assembly is configured to generate light directed towards the dimming assembly.

18. A display device, comprising the backlight module according to claim 17 and a liquid crystal panel located on a light-emitting side of the backlight module.

19. The dimming assembly according to claim 2, wherein a haze of the first prism sheet and a haze of the second prism sheet both range from 10% to 45%, and the haze of the first prism sheet is less than the haze of the second prism sheet.

20. The dimming assembly according to claim 3, wherein a haze of the first prism sheet and a haze of the second prism sheet both range from 10% to 45%, and the haze of the first prism sheet is less than the haze of the second prism sheet.

* * * * *